US008760852B2

United States Patent
Djebara et al.

(10) Patent No.: US 8,760,852 B2
(45) Date of Patent: Jun. 24, 2014

(54) SOLID ELECTROLYTIC CAPACITOR CONTAINING MULTIPLE SINTER BONDED ANODE LEADWIRES

(75) Inventors: Lotfi Djebara, Paris (FR); Ludek Kubes, Lanskroun (CZ); Pavel Bosak, Lanskroun (CZ)

(73) Assignee: AVX Corporation, Fountain Inn, SC (US)

( * ) Notice: Subject to any disclaimer, the term of this patent is extended or adjusted under 35 U.S.C. 154(b) by 136 days.

(21) Appl. No.: 13/454,360

(22) Filed: Apr. 24, 2012

(65) Prior Publication Data

US 2013/0279077 A1 Oct. 24, 2013

(51) Int. Cl.
*H01G 9/00* (2006.01)

(52) U.S. Cl.
USPC ........... 361/523; 361/517; 361/525; 361/528; 361/529; 361/530

(58) Field of Classification Search
USPC .......... 361/523, 525–528, 529–530, 516–519
See application file for complete search history.

(56) References Cited

U.S. PATENT DOCUMENTS

| | | | |
|---|---|---|---|
| 3,345,545 | A | 10/1967 | Bourgault et al. |
| 4,945,452 | A | 7/1990 | Sturmer et al. |
| 5,949,639 | A | 9/1999 | Maeda et al. |
| 6,191,936 | B1 | 2/2001 | Webber et al. |
| 6,447,570 | B1 | 9/2002 | Pozdeev-Freeman |
| 7,116,548 | B2 | 10/2006 | Satterfield, Jr. et al. |
| 7,594,937 | B2 | 9/2009 | Amita et al. |
| 7,929,274 | B2 | 4/2011 | Reed et al. |
| 8,066,783 | B2 | 11/2011 | Takeda |
| 2005/0237698 | A1 | 10/2005 | Postage et al. |
| 2009/0103243 | A1* | 4/2009 | Mizukoshi et al. ........... 361/523 |

FOREIGN PATENT DOCUMENTS

| | | |
|---|---|---|
| JP | 5718317 A | 1/1982 |
| WO | WO 9849356 A1 | 11/1998 |
| WO | WO 2005106905 A1 | 11/2005 |
| WO | WO 2006057455 A1 | 6/2006 |

OTHER PUBLICATIONS

Abstract of Japanese Patent—JP2004253501, Sep. 9, 2004, 2 pages.
Abstract of Japanese Patent—JP2004281619, Oct. 7, 2004, 2 pages.
Abstract of Japanese Patent—JP2005033097, Feb. 3, 2005, 2 pages.
Abstract of Japanese Patent—JP2008187091, Aug. 14, 2008, 2 pages.
Search Report for GB1301115.0 dated May 9, 2013, 3 pages.

(Continued)

*Primary Examiner* — Nguyen T Ha
(74) *Attorney, Agent, or Firm* — Dority & Manning, P.A.

(57) ABSTRACT

A capacitor containing a solid electrolytic capacitor element having a porous anode body and an anode lead assembly is provided. At least one wire of the lead assembly is electrically connected to the anode body for connection to an anode termination. The lead assembly contains first and second lead wires embedded within the anode body and extending therefrom in a longitudinal direction. The first and second wires are bonded/fused together during sintering of the anode body (i.e., "sinter bonded"). The bond may be metallurgical, covalent, electrostatic, etc. Sinter bonding of the wires reduces the path length and resistance for current flow within the anode body, thus reducing ESR. This is particularly useful for anode bodies formed from powders of a high specific charge, which tend to shrink away from the wires after sintering. The sinter bonded wires also result in a lead assembly that is more robust and mechanically stable.

22 Claims, 2 Drawing Sheets

(56) References Cited

OTHER PUBLICATIONS

Hintz et al., "Anode Lead Wire Pre-Treatments for Improved Lead Wire Bonding in Tantalum Capacitor Anodes Processed by De-Oxidation/Sintering," CARTS USA, Mar. 15-18, 2010, New Orleans, Louisiana, 13 pages.

Vasina et al., "Failure Modes of Tantalum Capacitors Made by Different Technologies," CARTS USA, Mar./Apr. 2001, 6 pages.

Related U.S. Patent Application Form.

* cited by examiner

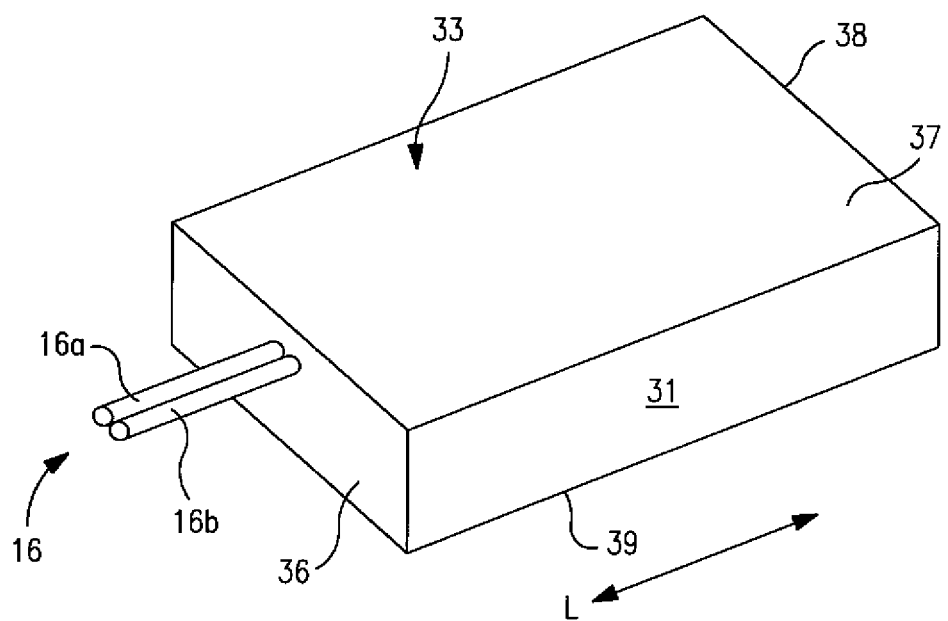
FIG. 1
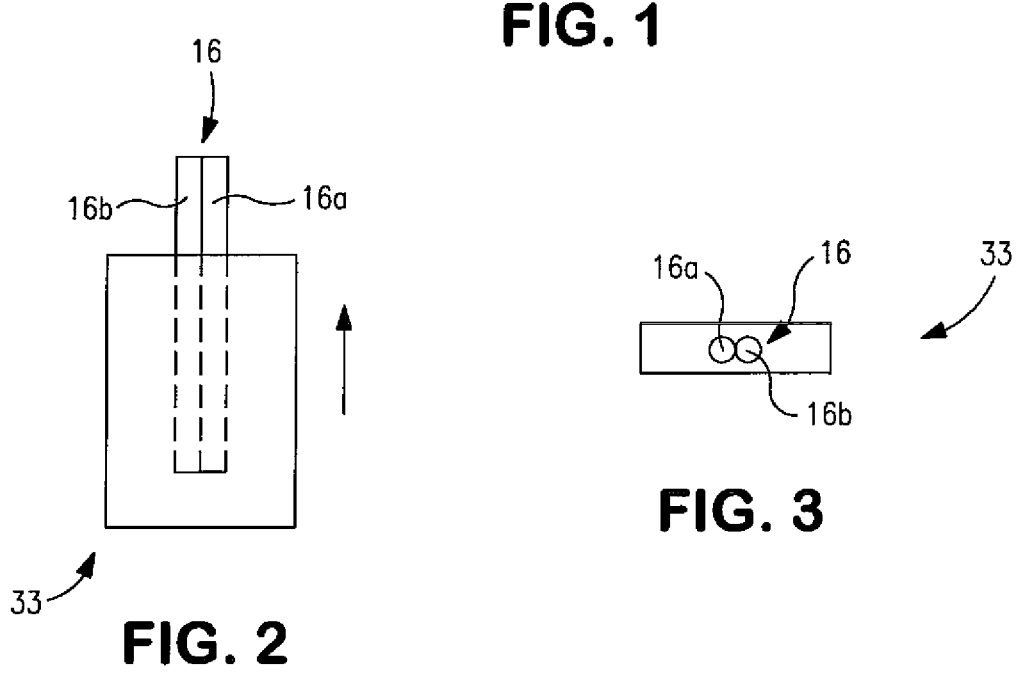
FIG. 2
FIG. 3

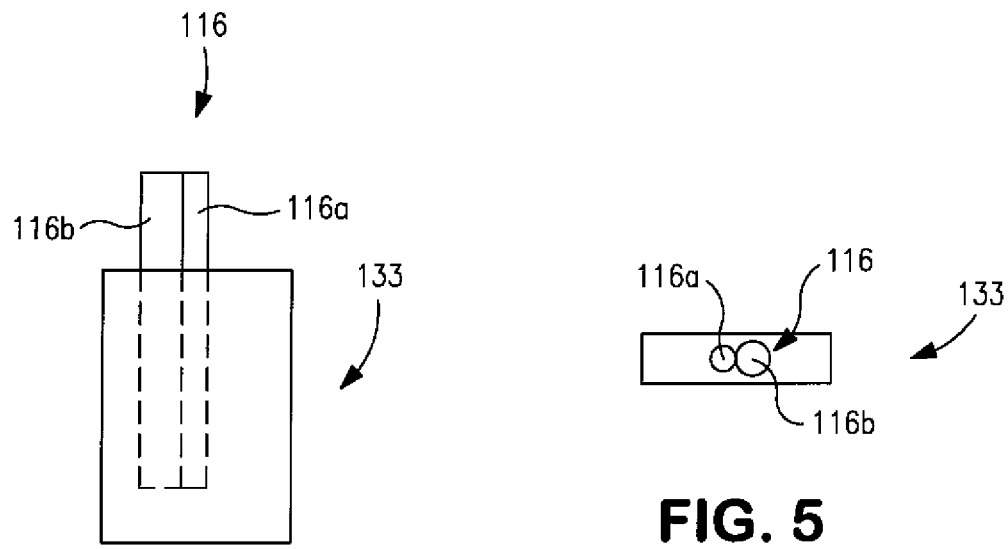
FIG. 4
FIG. 5
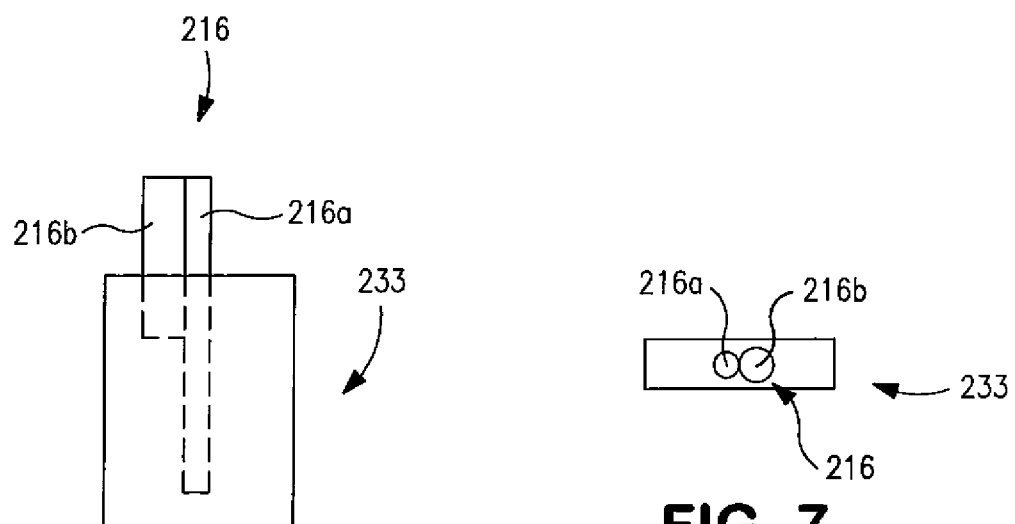
FIG. 6
FIG. 7

SOLID ELECTROLYTIC CAPACITOR CONTAINING MULTIPLE SINTER BONDED ANODE LEADWIRES

BACKGROUND OF THE INVENTION

Solid electrolytic capacitors (e.g., tantalum capacitors) have been a major contributor to the miniaturization of electronic circuits and have made possible the application of such circuits in extreme environments. The anode of a typical solid electrolytic capacitor includes a porous anode body, with a lead wire extending beyond the anode body and connected to an anode termination of the capacitor. The anode can be formed by first pressing a tantalum powder into a pellet that is then sintered to create fused connections between individual powder particles. One problem with many conventional solid electrolytic capacitors is that there is resistance to current flow from the anode termination to the lead wire attached to or embedded in the anode body, which contributes to the equivalent series resistance (ESR) of the finished device. Resistances inside the body of the anode generate parallel resistances that also contribute to the ESR of the finished device. The current travels from the point of lead wire egress to the anode body to all points of the anode body through the path(s) of least resistance. The current must pass from the lead wire into the anode body through points of contact between the lead wire and the particles of the anode body. The current must then travel through the porous anode body, through small necks of the sintered particles.

Increasing the lead wire diameter decreases resistance in the wire itself and between the wire and the anode body. Unfortunately, increasing the wire diameter also reduces the capacitance by displacing porous anode body material that would otherwise contribute to capacitance. In attempt to solve this problem, attempts have been made to employ multiple lead wires based on the theory that the path length from points in the porous body become closer to at least one anode lead wire. For example, U.S. Pat. No. 7,116,548 to Satterfield, Jr., et al. and U.S. Patent Publication No. 2005/0237698 to Postage, et al. each describe various different configurations of multi-wire capacitors. Unfortunately, however, these solutions are still not fully satisfactory in achieving ultralow ESR levels. This is particularly evident in capacitors that employ high specific charge ("CV") powders. Namely, such powders tend to shrink away and separate from an embedded anode wire during sintering, which can reduce the degree to which the wire is bonded to the particles of the anode body and increase ESR. This problem is actually compounded when multiple anode wires are employed because the total area of poor bonding increases.

As such, a need currently exists for an improved solid electrolytic capacitor that can exhibit a low ESR.

SUMMARY OF THE INVENTION

In accordance with one embodiment of the present invention, a solid electrolytic capacitor is disclosed that comprises a capacitor element. The capacitor element comprises a sintered, porous anode body, wherein a lead assembly is embedded within the anode body and extends from a surface thereof. The lead assembly contains a first anode wire positioned adjacent to and sinter bonded to a second anode wire, the first and second wire both extending in a longitudinal direction. A dielectric overlies the sintered porous anode body and a cathode overlies the dielectric layer that includes a solid electrolyte.

In accordance with another embodiment of the present invention, a method for forming a solid electrolytic capacitor element is disclosed. The method comprises embedding a lead assembly within a powder formed from a valve metal composition, the lead assembly containing a first anode wire and a second anode wire; compacting the powder around the lead assembly; sintering the compacted powder and the lead assembly to form a porous anode body and to sinter bond the first wire to the second wire; anodically oxidizing the sintered anode body to form a dielectric layer; and applying a solid electrolyte to the anodically oxidized sintered anode body.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 1 is perspective view of one embodiment of the electrolytic capacitor of the present invention;

FIG. 2 is a top view of the electrolytic capacitor of FIG. 1;

FIG. 3 is a frontal view of the electrolytic capacitor of FIG. 1;

FIG. 4 is a top view of another embodiment of the electrolytic capacitor of the present invention;

FIG. 5 is a frontal view of the electrolytic capacitor of FIG. 4;

FIG. 6 is a top view of another embodiment of the electrolytic capacitor of the present invention; and FIG. 7 is a frontal view of the electrolytic capacitor of FIG. 6.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a capacitor containing a solid electrolytic capacitor element that includes a sintered porous anode body. An anode lead assembly is electrically connected to the anode body for connection to an anode termination. The lead assembly contains first and second lead wires embedded within the anode body and extending therefrom in a longitudinal direction. Contrary to conventional capacitor configurations, however, the first and second wires are bonded or fused together during sintering of the anode body (i.e., "sinter bonded"). The nature of the bond may vary, such as metallurgical, covalent, electrostatic, etc. Regardless, sinter bonding of the wires can further reduce the path length and resistance for current flow within the anode body, and thus reduce ESR. This is particularly useful for anode bodies formed from powders of a high specific charge, which tend to shrink away from the wires after sintering. In addition, the sinter bonded wires can also result in a lead assembly that is more robust and mechanically stable, which further improves the electrical performance of the resulting capacitor.

Referring to FIGS. 1-3, one particular embodiment of an anode that is formed from a porous anode body 33 and a lead assembly 16 will now be described in more detail. In this particular embodiment, the anode body 33 is in the shape of a rectangular pellet having an upper surface 37, lower surface 39, front surface 36, rear surface 38, a first side surface 31, and a second side surface (now shown). In addition to having a rectangular shape, other shapes may also be employed, such as sinusoidal, cylindrical, U-shaped, V-shaped, etc. The anode may be "fluted" in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

An anode lead assembly 16 extends from the front surface 36 of the anode body 33 in a longitudinal direction "L." It should be understood that the lead assembly 16 may also extend from any other surface of the body 33. Furthermore, the wires of the assembly need not extend from a common surface of the porous body. As indicated above, the lead assembly 16 contains a first anode wire 16a positioned adjacent and sintered bonded to a second anode wire 16b. If desired, more than two wires may also be employed, such as 3, 4, or even more. Regardless of the number employed, the wires are formed from an electrically conductive material, such as tantalum, niobium, nickel, aluminum, hafnium, titanium, etc., as well as oxides and/or nitrides of thereof (e.g., niobium oxide). Further, regardless of the number of wires employed, only one need be electrically connected to the anode termination. For example, if two anode wires are used in a lead assembly, one wire can be electrically connected to the anode termination, while the other wire can be used as a sacrificial wire, which can help improve the stability of the lead wire assembly, such as by improving the bonding between the lead assembly and the particles of the anode body.

The wires 16a and 16b may possess any desired cross-sectional shape, such as circular, elliptical, square, rectangular, etc. Likewise, the size of the wires 16a and 16b may generally vary depending on the overall size of the anode body 33. In most embodiments, the ratio of the length of the wires in the longitudinal direction to the width (or thickness) of the wires ("aspect ratio") will vary from about 2 to about 150, in some embodiments, from about 5 to about 100, and in some embodiments, from about 15 to about 90. For example, the wires may have a width or thickness of from about 20 micrometers to about 1000 micrometers, in some embodiments from about 50 to about 800 micrometers, and in some embodiments, from about 100 to about 600 micrometers. Likewise, the overall lead assembly may have a width or thickness of from about 50 micrometers to about 2000 micrometers, in some embodiments from about 100 micrometers to about 1500 micrometers, and in some embodiments, from about 200 micrometers to about 1000 micrometers.

While the wires can have the same approximate size (e.g., width or thickness), one particular benefit of the present invention is that one of the wires may have a size that is greater than another of the wires. The ratio of the width or thickness of the larger wire to the width of the smaller wire may be, for example, from about 1 to about 10, in some embodiments from about 1.5 to about 8, and in some embodiments, from about 2 to about 5. Among other things, the larger-sized wire can be used as the location of electrical connection to the anode termination. This, in turn, allows the smaller-sized wire to be employed primarily to increase the degree of contacts with the porous anode body and to enhance mechanical stability. In this way, the smaller-sized wire can be used as a sacrificial wire that does not form an electrical connection with the anode termination. Through the use of different, yet sintered bonded anode wires in this manner, at least a portion of the lead assembly can avoid the damage that is often encountered during electrical connection to the anode termination, such as during laser welding.

Referring to FIGS. 4-5, one particular embodiment of a lead assembly 116 for an anode 133 is shown that employs a first wire 116a that is smaller in width or thickness (e.g., diameter) than a second wire 116b. The width or thickness of the smaller wire 116a may, for example, range from about 50 micrometers to about 250 micrometers, in some embodiments from about 100 micrometers to about 225 micrometers, and in some embodiments, from about 120 micrometers to about 220 micrometers. Likewise, the width or thickness of the larger wire 116b may range from about 250 micrometers to about 1000 micrometers, in some embodiments from about 300 micrometers to about 800 micrometers, and in some embodiments, from about 450 micrometers to about 550 micrometers.

In the embodiment illustrated in FIGS. 4-5, each of the wires has the same length. However, this is by no means required. Referring to FIGS. 6-7, one particular embodiment of a lead assembly 216 for an anode 233 is shown that employs a second wire 216b that is shorter in length than a first wire 216a, yet greater in width or thickness. This minimizes the use of excess material for the thicker wire 216b, which can be employed for electrical connection to the anode termination, but nevertheless takes advantage of the longer, smaller wire 216a to achieve good contact with the anode body 233. The shorter length of the wire 216b can be achieved by simply trimming one of the wires prior to use. The ratio of the length of the longer wire to the width of the shorter wire may range from about 1 to about 10, in some embodiments from about 1.5 to about 8, and in some embodiments, from about 2 to about 5. For example, the length of the longer wire 116a may range from about 6 to about 10 millimeters, in some embodiments from about 6 to about 12 millimeters, and in some embodiments, from about 6 to about 15 millimeters. Likewise, the length of the shorter wire 116b may range from about 4 to about 5 millimeters, in some embodiments from about 3 to about 5 millimeters, and in some embodiments, from about 2 to about 5 millimeters.

The anode body 33 is typically formed from a valve metal composition having a high specific charge, such as about 5,000 μF*V/g or more, in some embodiments about 10,000 μF*V/g or more, in some embodiments about 20,000 μF*V/g or more. As noted above, the lead assembly of the present invention is particularly useful for "high specific charge" powders, which tend to shrink and pull away from the lead wires during sintering to a greater extent than lower specific charge powders. Such powders typically have a specific charge of from about 15,000 to about 600,000 μF*V/g, in some embodiments from about 20,000 to about 500,000 μF*V/g, in some embodiments from about 25,000 to about 400,000 μF*V/g, in some embodiments from about 30,000 to about 350,000 μF*V/g, and in some embodiments, from about 35,000 to about 300,000 μF*V/g. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

To form the anode, a powder of the valve metal composition is generally employed. The powder may contain particles any of a variety of shapes, such as nodular, angular, flake, etc., as well as mixtures thereof. Particularly suitable powders are tantalum powders available from Cabot Corp. and H.C. Starck. Although not required, the powder may be agglomerated using any technique known in the art, such as through heat treatment. Prior to forming the powder into the shape of an anode, it may also be optionally mixed with a binder and/or lubricant to ensure that the particles adequately adhere to each other when pressed to form the anode body. The resulting powder may then be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing.

Regardless of its particular composition, the powder is compacted around the anode lead assembly of the present invention so that at least a portion of the assembly extends from the compacted body. In one particular embodiment, a press mold may be employed that includes a die having two or more portions (e.g., upper and lower portions). During use, the portions of the die may be placed adjacent to each other so that their walls are substantially aligned to form a die cavity having the desired shape of the anode. Before, during, and/or after loading a certain quantity of powder into the die cavity, the anode wires of the present invention may be embedded therein. The die may define a single or multiple slots that allow for the insertion of the wires. Because it is desired to bond the wires as described above, they are generally placed in close proximity to each other, although they do not necessarily need to be in direct physical contact prior to sintering. After filling the die with powder and embedding the anode wires therein, the die cavity may then be closed and subjected to compressive forces by a punch. Typically, the compressive forces are exerted in a direction that is either generally parallel or generally perpendicular to the longitudinal axis "L" of the wires. This forces the particles into close contact with the wires and creates a strong wire-to-powder bond.

Any binder/lubricant may be removed after pressing by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the porous anode body is sintered to form a porous, integral mass and to bond the anode wires together. The present inventors have discovered that certain sintering conditions may facilitate sinter bonding of the anode wires. More particularly, the pellet is typically sintered at a temperature of from about 1200° C. to about 2000° C., in some embodiments from about 1300° C. to about 1900° C., and in some embodiments, from about 1500° C. to about 1800° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

Once constructed, a dielectric may be formed by anodically oxidizing ("anodizing") the sintered anode body so that a dielectric layer is formed over and/or within the pores of the body. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

The capacitor element also contains a solid electrolyte that functions as the cathode for the capacitor. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes.

Alternatively, the solid electrolyte may be formed from one or more conductive polymer layers. The conductive polymer(s) employed in such layers are typically π-conjugated and have electrical conductivity after oxidation or reduction, such as an electrical conductivity of at least about 1 μS cm$^{-1}$ after oxidation. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Particularly suitable conductive polymers are substituted polythiophenes having the following general structure:

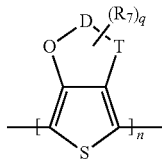

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

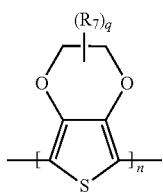

Methods for forming conductive polymers, such as described above, are well known in the art. For instance, U.S. Pat. No. 6,987,663 to Merker, et al., which is incorporated herein in its entirety by reference thereto for all purposes, describes various techniques for forming substituted polythiophenes from a monomeric precursor. The monomeric precursor may, for instance, have the following structure:

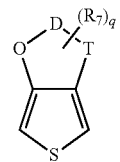

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

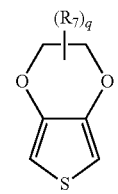

wherein, $R_7$ and q are as defined above. In one particular embodiment, "q" is 0. One commercially suitable example of 3,4-ethylenedioxthiophene is available from Heraeus Clevios under the designation Clevios™ M. Other suitable monomers are also described in U.S. Pat. No. 5,111,327 to Blohm, et al. and U.S. Pat. No. 6,635,729 to Groenendaal, et al., which are incorporated herein in their entirety by reference thereto for all purposes. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

The thiophene monomers are chemically polymerized in the presence of an oxidative catalyst. The oxidative catalyst typically includes a transition metal cation, such as iron(III), copper(II), chromium(VI), cerium(IV), manganese(IV), manganese(VII), ruthenium(III) cations, etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

Various methods may be utilized to form a conductive polymer layer. In one embodiment, the oxidative catalyst and monomer are applied, either sequentially or together, such that the polymerization reaction occurs in situ on the part. Suitable application techniques may include screen-printing, dipping, electrophoretic coating, and spraying, may be used to form a conductive polymer coating. As an example, the monomer may initially be mixed with the oxidative catalyst to form a precursor solution. Once the mixture is formed, it may be applied to the part and then allowed to polymerize so that the conductive coating is formed an the surface. Alternatively, the oxidative catalyst and monomer may be applied sequentially. In one embodiment, for example, the oxidative catalyst is dissolved in an organic solvent (e.g., butanol) and then applied as a dipping solution. The part may then be dried to remove the solvent therefrom. Thereafter, the part may be dipped into a solution containing the monomer.

Polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In addition to in situ application, a conductive polymer layer may also be applied in the form of a dispersion of conductive polymer particles. Although their size may vary, it is typically desired that the particles possess a small diameter to increase the surface area available for adhering to the anode part. For example, the particles may have an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymers into a particulate form may be enhanced by using a separate counterion to counteract the positive charge carried by the substituted polythiophene. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to substituted polythiophenes in a given layer is typically from about 0.5:1 to about 50:1, in some embodiments from about 1:1 to about 30:1, and in some embodiments, from about 2:1 to about 20:1. The weight of the substituted polythiophene referred to in the above-referenced weight ratios refers to the weighed-in portion of the monomers used, assuming that a complete conversion occurs during polymerization.

The dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking. Other components may also be included within the dispersion as is known in the art, such as dispersion agents (e.g., water), surface-active substances, etc.

If desired, one or more of the above-described application steps may be repeated until the desired thickness of the coating is achieved. In some embodiments, only a relatively thin layer of the coating is formed at a time. The total target thickness of the coating may generally vary depending on the desired properties of the capacitor. Typically, the resulting conductive polymer coating has a thickness of from about 0.2 micrometers ("μm") to about 50 μm, in some embodiments from about 0.5 μm to about 20 μm, and in some embodiments, from about 1 μm to about 5 μm. It should be understood that the thickness of the coating is not necessarily the same at all locations on the part. Nevertheless, the average thickness of the coating on the substrate generally falls within the ranges noted above.

The conductive polymer layer may optionally be healed. Healing may occur after each application of a conductive polymer layer or may occur after the application of the entire coating. In some embodiments, the conductive polymer can be healed by dipping the part into an electrolyte solution, and thereafter applying a constant voltage to the solution until the current is reduced to a preselected level. If desired, such healing can be accomplished in multiple steps. For example, an electrolyte solution can be a dilute solution of the monomer, the catalyst, and dopant in an alcohol solvent (e.g., ethanol). The coating may also be washed if desired to remove various byproducts, excess reagents, and so forth.

If desired, the capacitor may also contain other layers as is known in the art. For example, a protective coating may optionally be formed between the dielectric and solid electrolyte, such as one made of a relatively insulative resinous material (natural or synthetic). Such materials may have a specific resistivity of greater than about 10 Ω/cm, in some embodiments greater than about 100, in some embodiments greater than about 1,000 Ω/cm, in some embodiments greater than about $1\times10^5$ Ω/cm, and in some embodiments, greater than about $1\times10^{10}$ Ω/cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or triglycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

The thickness of the resulting capacitor element may vary as desired, but typically is about 4 millimeters or less, in some embodiments, from about 0.05 to about 2 millimeters, and in some embodiments, from about 0.1 to about 1 millimeter.

Regardless of the particular manner in which the capacitor is formed, it can be connected to terminations as is well known in the art. For example, anode and cathode terminations may be electrically connected to the anode wire(s) and the cathode, respectively. The specific configuration of the terminations may vary as is well known in the art. In one embodiment, for example, the cathode termination may contain a planar portion in electrical contact with a lower surface of the capacitor element and an upstanding portion positioned substantially perpendicular to the planar portion and in electrical contact with a rear surface of the capacitor. To attach the capacitor element to the cathode termination, a conductive adhesive may be employed as is known in the art. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al., which is incorporated herein in its entirety by reference thereto for all purposes.

The anode termination may likewise contain a planar portion and an upstanding portion. The upstanding portion may contain a region that carries the anode lead assembly of the present invention. For example, the region may possess a single slot for receiving both the first and second anode wires. Alternatively, the region may possess separate slots for each wire. In another embodiment, as discussed above, only one anode wire may be electrically connected to the anode termination so that the region may possess only a single slot for receiving only one of the anode wires. The slot may have any desired shape, such as a U-shape, V-shape, etc. for further enhancing surface contact and mechanical stability of the wires. Any technique may be used to connect the wire(s) to the anode termination, such as resistance welding, laser welding, conductive adhesives, etc. Once the capacitor is attached to the terminations, it is enclosed within a resin casing, which may then be filled with silica or any other known encapsulating material. The width and length of the case may vary depending on the intended application. However, the overall thickness of the casing is typically small so that the resultant assembly may be readily incorporated into low profile products (e.g., "IC cards"). For example, the thickness of the casing may range from about 4.0 millimeters or less, in some embodiments, from about 0.1 to about 2.5 millimeters, and in some embodiments, from about 0.15 to about 2.0 millimeters. Suitable casings may include, for instance, "A", "B", "H", or "T" cases (AVX Corporation). After encapsulation, exposed portions of the respective anode and cathode terminations may be aged, screened, and trimmed. If desired, the exposed portions may be optionally bent twice along the outside of the casing 88 (e.g., at an approximately 90° angle).

As a result of the present invention, a capacitor may be formed that exhibits excellent electrical properties. For example, the capacitor of the present invention can exhibit an ultralow ESR, such as about 300 milliohms (mΩ) or less, in some embodiments about 100 mΩ or less, in some embodiments from about 0.01 to about 50 mΩ, and in some embodiments, from about 0.1 to about 20 mΩ, determined at a frequency of 100 kHz and a temperature of 23° C.±2° C. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 0.1 μA/μF*V, in some embodiments less than about 0.01 μA/μF*V, and in some embodiments, less than about 0.001 μA/μF*V, wherein μA is microamps and uF*V is the product of the capacitance and the rated voltage.

The present invention may be better understood by the following examples.

Test Procedures

Equivalent Series Resistance ("ESR")

ESR generally refers to the extent that the capacitor acts like a resistor when charging and discharging in an electronic circuit and is usually expressed as a resistance in series with the capacitor. ESR is typically measured using a Keithley 3330 Precision LCZ meter with Kelvin Leads 2.2 volt DC bias and a 0.5 volt peak to peak sinusoidal signal, at an operating frequency of 100 kHz and temperature of 23° C.±2° C.

Capacitance ("Cap")

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Leakage Current:

Leakage current ("DCL") was measured using a leakage test set that measures leakage current at a temperature of 23° C.±2° C. and at the rated voltage after a minimum of 20 seconds.

Example 35,000 μFV/g tantalum powder was pressed into pellets to form a porous body having dimensions of 5.20 mm (length) by 3.70 mm (width) by 0.95 mm (thickness). The tantalum powder was charged into the hopper of a tantalum device automatic molding machine and automatically molded together with one 0.19 mm (width) and one 0.50 mm (width) tantalum wire simultaneously to manufacture a porous body containing two anode wires. The length of the thicker lead wire was 4.4 mm (3.3 mm inside the porous body) and the length of thinner lead wire was 9.4 mm (6.1 mm inside the porous body). This molded body was left standing under reduced pressure at 1,400° C. to obtain a sintered body.

The tantalum anode was anodized at 18V in a liquid electrolyte of 0.1% phosphoric acid to make capacitors having a capacitance of 150 μF at 120 Hz. A conductive polymer coating was then formed by dipping the tantalum anode into a butanol solution of iron (III) toluenesulfonate (Clevios™ C, H.C. Starck) for 5 minutes and consequently into 3,4-ethylenedioxythiophene (Clevios™ M, H.C. Starck) for 1 minute. After 45 minutes of polymerization, a thin layer of poly(3,4-ethylenedioxythiophene) was formed on the surface of the dielectric. The parts were washed in methanol to remove reaction by-products, anodized in a liquid electrolyte, and washed again in methanol. The polymerization cycle was repeated 10 times. The finished parts were completed by conventional assembly technology and measured. A copper-based leadframe was used for finishing of the assembly process. The leadframe was designed to have a U-shape design for anode lead attaching (positive termination). The anode lead was adjusted to appropriately 'seat' on the U-Shape (recess) and was then laser welded. Once the capacitor element was attached, the leadframe was enclosed with encapsulating epoxy resin.

Comparative Examples

Capacitors were formed in the manner described in Example, except that only a single anode wire was used. In case of comparative example 1, tantalum powder was molded together with a 0.19 mm (width) wire and in the case of comparative example 2 with a 0.50 mm (width) wire. Multiple parts (50) were made and then tested for electrical performance (i.e., leakage current, ESR, and capacitance before aging).

Table 1 summarizes the median outputs from example 1 compared with the two comparative examples. As shown in table 1, the benefit of using multiple wires is that the ESR values are reduced when compared with the comparative examples that contained only a single tantalum wire.

TABLE 1

|  | DCL [μA] | ESR [mΩ] | Cap [μF] |
| --- | --- | --- | --- |
| Example 1 | 295 | 9.1 | 176 |
| Comparative Example 1 | 283 | 20.2 | 186 |
| Comparative Example 2 | 484 | 10.7 | 174 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor that comprises a capacitor element, the capacitor element comprising:
   a sintered, porous anode body, wherein a lead assembly is embedded within the anode body and extends from a surface thereof, the lead assembly containing a first anode wire positioned adjacent to and sinter bonded to a second anode wire, the first and second wire both extending in a longitudinal direction;
   a dielectric layer overlying the sintered porous anode body; and
   a cathode overlying the dielectric layer that includes a solid electrolyte.

2. The solid electrolytic capacitor of claim 1, wherein the lead assembly contains more than two anode wires.

3. The solid electrolytic capacitor of claim 1, wherein the first anode wire, the second anode wire, or both have an aspect ratio of from about 2 to about 150.

4. The solid electrolytic capacitor of claim 1, wherein the first anode wire, the second anode wire, or both have an aspect ratio of from about 15 to about 90.

5. The solid electrolytic capacitor of claim 1, wherein the first anode wire, the second anode wire, or both have a width of from about 20 micrometers to about 1000 micrometers.

6. The solid electrolytic capacitor of claim 1, wherein the first anode wire, the second anode wire, or both have a width of from about 100 micrometers to about 600 micrometers.

7. The solid electrolytic capacitor of claim 1, wherein the width of the first wire is smaller than the width of the second wire.

8. The solid electrolytic capacitor of claim 7, wherein the ratio of the width of the second wire to the width of the first wire is from about 1.5 to about 8.

9. The solid electrolytic capacitor of claim 7, wherein the width of the second wire is from about 250 micrometers to about 1000 micrometers and the width of the first wire is from about 50 micrometers to about 250 micrometers.

10. The solid electrolytic capacitor of claim 7, further comprises an anode termination that is welded to only the second wire of the lead assembly.

11. The solid electrolytic capacitor of claim 1, wherein the length of the second wire is less than the length of the first wire.

12. The solid electrolytic capacitor of claim 11, wherein the ratio of the length of the first wire to the length of the second wire is from about 1.5 to about 8.

13. The solid electrolytic capacitor of claim 1, wherein the anode body is formed from a powder having a specific charge of from about 15,000 μF*V/g to about 600,000 μF*V/g.

14. The solid electrolytic capacitor of claim 1, wherein the anode body contains tantalum, niobium, or an electrically conductive oxide thereof.

15. The solid electrolytic capacitor of claim 1, further comprising an anode termination that is electrically connected to the lead assembly, a cathode termination that is electrically connected to the cathode, and a molding material that encapsulates the capacitor element and leaves exposed at least a part of the anode termination and at least a part of the cathode termination.

16. The solid electrolytic capacitor of claim 1, wherein the solid electrolyte includes manganese dioxide or a conductive polymer.

17. The solid electrolytic capacitor of claim 1, wherein the capacitor exhibits an ESR of about 100 mΩ or less, as determined at a frequency of 100 kHz and a temperature of 23° C.±2° C.

18. The solid electrolytic capacitor of claim 1, wherein the capacitor exhibits an ESR of from about 1 mΩ to about 20 mΩ, as determined at a frequency of 100 kHz and a temperature of 23° C.±2° C.

19. A method for forming a solid electrolytic capacitor element, the method comprising:
   embedding a lead assembly within a powder formed from a valve metal composition, the lead assembly containing a first anode wire and a second anode wire;
   compacting the powder around the lead assembly;
   sintering the compacted powder and the lead assembly to form a porous anode body and to sinter bond the first wire to the second wire;
   anodically oxidizing the sintered anode body to form a dielectric layer; and
   applying a solid electrolyte to the anodically oxidized sintered anode body.

20. The method of claim 19, wherein sintered occurs at a temperature of from about 1200° C. to about 2000° C.

21. The method of claim 19, wherein the width of the first wire is smaller than the width of the second wire.

22. The method of claim 19, wherein the length of the second wire is less than the length of the first wire.

* * * * *